Sept. 9, 1952 G. F. DEVINE 2,610,228

MARKER SIGNAL GENERATOR

Filed Sept. 2, 1949

Inventor:
George F. Devine,
by Merton D. Morse
His Attorney.

Patented Sept. 9, 1952

2,610,228

UNITED STATES PATENT OFFICE 2,610,228

MARKER SIGNAL GENERATOR

George F. Devine, Marcellus, N. Y., assignor to General Electric Company, a corporation of New York Application September 2, 1949, Serial No. 113,873

5 Claims. (Cl. 175—183)

Figure 1:
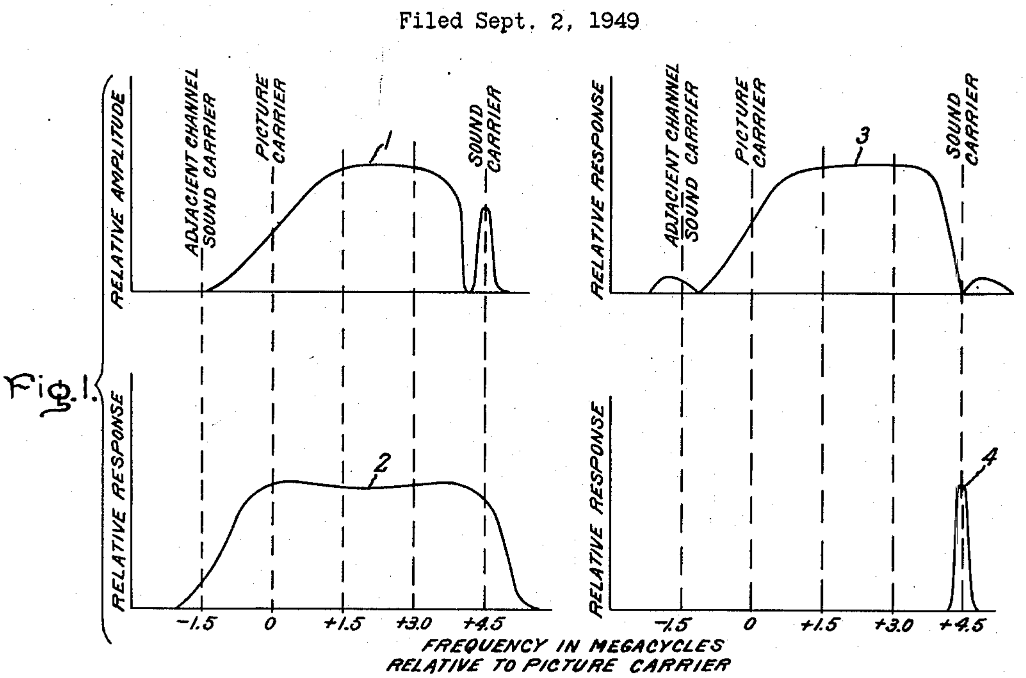

This invention relates to a system for generating marker voltages in connection with a sweep frequency oscillator and a cathode ray oscilloscope used for determining the frequency response characteristics of electrical circuits.

The method of determining the frequency response characteristics of a network, by supplying to it a signal of constant amplitude whose frequency is varied cyclically, is well known in the art. The output voltages from the network may be applied to the vertical deflection plates of a cathode ray tube, while a sweep voltage, for causing the light spot produced by the cathode beam to sweep across the fluorescent screen of the tube, is applied to the horizontal deflection plates. Thus, the cathode beam describes a luminous trace whose vertical co-ordinate is a measure of the amplitude of the output or, in other words, of the response, and whose horizontal co-ordinate, being synchronized in time with the frequency sweep of the oscillator, is a measure of the frequency.

In such a system it is often desirable to produce identifying markers on the fluorescent screen, which markers are accurately correlated with a particular frequency. Thus, for instance, in television apparatus it is highly desirable to have markers for indicating the exact frequency of the picture carrier and also the exact frequency of the sound carrier which, in accordance with the present American standards, is located 4.5 megacycles higher in the frequency spectrum. It is also desirable to have intermediate frequency marker points, for instance, marker points at 1.5 megacycles intervals throughout the frequency band of a television channel, the 1.5 interval being especially useful because, in accordance with present American standards it is the interval between the desired picture channel carrier and the adjacent channel sound carrier.

Accordingly, it is an object of my invention to provide a system for generating accurate markers, at desirable and accurately spaced frequency intervals, which are suitable for display on the screen of a cathode ray tube utilized in conjunction with a sweep frequency oscillator.

Another object of my invention is to provide a marker signal generator, for use in conjunction with a sweep frequency oscillator, which provides multiple marker signals with a greater degree of accuracy, for the same amount of equipment, than heretofore possible.

A further object of my invention is to provide a plurality of frequency markers in connection with a signal, without the necessity for retuning a marker-frequency generator, so that all necessary markers are obtained with one setting of a single dial or control.

For further objects and advantages and for a better understanding of the invention, attention is now directed to the following description and accompanying drawings. The features of my invention believed to be novel are more particularly pointed out in the appended claims.

In the drawings:

Fig. 1 contains a series of curves illustrating certain characteristics of a television transmission and the response characteristics of typical television receiver circuits.

Figure 2:
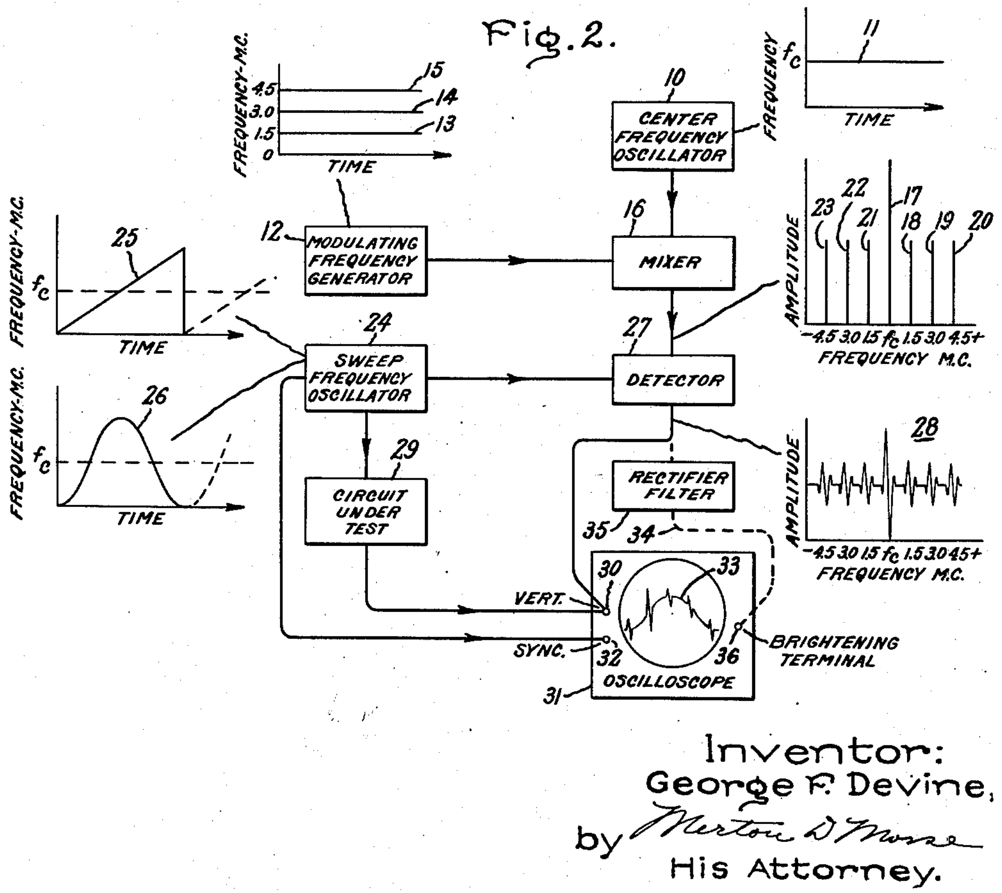

Fig. 2 is a schematic diagram, in block form, of a marker signal generating system embodying my invention, along with certain curves illustrating the operating characteristics of the different components thereof.

Referring to Fig. 1, curve 1 illustrates the frequency spectrum of a standard television transmission; curve 2 illustrates the response characteristics of a typical television receiver from the antenna to the first detector; and curves 3 and 4 illustrate the response characteristics of a picture or video intermediate frequency amplifier and of a sound or aural intermediate frequency amplifier, respectively. The curves are plotted to a common scale, with relative frequency measured from the picture carrier as abscissae, and with relative amplitude or relative response as ordinates, and illustrate typical transmissions and circuits in accordance with present American standards. The picture carrier frequency, with respect to curves 1 and 2, might for instance be 77.25 megacycles, corresponding to the television channel commonly known as number 5, and with respect to curves 3 and 4, it might be 27 megacycles, which is a commonly utilized intermediate frequency.

When the frequency responses of such circuits are determined by means of a sweep frequency oscillator and a cathode ray oscilloscope indicator, it is desirable that indications be made available on the screen of the cathode ray tube to accurately indicate the frequencies of the picture carrier and of the adjacent channel sound carrier, and also other suitable points to define the response curved. My invention, of which a detailed description now follows, provides these indications or markers.

Referring to Fig. 2, there is shown a center frequency oscillator 10, which provides an output voltage at a constant frequency $f_c$ coinciding with the intended picture carrier frequency, as illustrated by curve 11. Oscillator 10 may be continuously variable, or it may be of a crystal type provided with a switch for selecting different crystal controlled operating frequencies. In a preferred embodiment, oscillator 10 is continuously variable over the intermediate frequency range commonly utilized in television receivers, and is crystal controlled for each one of the television picture carrier frequencies established by the Federal Communications Commission.

A modulating frequency generator 12 supplies signals of frequency 1.5, 3.0, and 4.5 megacycles, as illustrated by curves 13, 14, and 15 respectively. These signals may be obtained readily from a single 1.5 megacycle crystal by utilizing its harmonics, or from a 4.5 megacycle crystal by means of a frequency divider circuit. The signals from oscillator 10 and generator 12 are supplied to a mixer 16, which may be a non-linear detector. In accordance with well known principles, the resulting output voltage from the mixer 16 contains a signal of the frequency $f_c$ and also modulation side-bands at frequencies $f_c$, $f_c \pm 1.5$, $f_c \pm 3.0$, and $f_c \pm 4.5$ megacycles. In a preferred embodiment of my invention, switches are provided in modulation generator 12 for the purpose of selecting the desired harmonics and thereby resulting side bands, which as will be explained presently, control the frequency markers. Curve 17 illustrates the carrier frequency output from mixer 16, while curves 18, 19, 20, and 21, 22, 23 illustrate the side frequencies located on either side thereof.

A sweep frequency oscillator 24 provids a signal of constant amplitude and having a frequency which is varied repeatedly through a certain range centered about the frequency $f_c$. In practice, it is convenient to provide the variation of frequency with respect to time in the output of oscillator 24, as either a sawtooth or a sinusoidal wave. Curves 25 and 26 represent one cycle of the output of oscillator 24, on a sawtooth and on a sinusoidal basis respectively. The output voltage from sweep frequency oscillator 24, as illustrated by curves 25 or 26, and that from mixer 16 as illustrated by curves 17 to 23 are supplied to a detector circuit 27. When the instantaneous frequency of the signal supplied from sweep frequency oscillator 24 approaches one of the frequencies supplied from the mixer 16, a useful beat frequency is generated in the output, in accordance with well known principles.

Detector 27 is provided with a suitable low-pass filter so that its high frequency response is limited, and its output may be illustrated by curve 28 which shows the variation in amplitude of the detector output as a function of the instantaneous frequency of sweep frequency oscillator 24. It will be noted that strong beats occur about the frequency $f_c$, and also about the desired side-band frequency points spaced 1.5 megacycles apart. The larger amplitude of the beat at frequency $f_c$ is due to the normal amplitude relation that exists between carrier and side-bands from the mixer 16.

The output voltage from oscillator 24, as illustrated by curves 25 or 26, is supplied to the circuit under test 29. This circuit may, for instance, be the intermediate frequency amplifier for the picture carrier in a television receiver. However, the actual type of circuit is immaterial, and this particular circuit is mentioned simply because it provides a response of a type in which marker signals produced in accordance with my invention are particularly useful. The output voltage from circuit 29 is a rectified signal and is supplied to a terminal 30 of oscilloscope 31. Terminal 30 may be connected either directly to the vertical deflection plates of the cathode ray tube contained in oscilloscope 31, or to a suitable vertical deflection amplifier contained therein and not shown in the drawing. A connection is also provided from sweep frequency oscillator 24 to a terminal 32 on oscilloscope 31. This connection is for the purpose of providing an internal deflection voltage generator in the oscilloscope with a suitable synchronizing signal, when a sawtooth frequency sweep corresponding to curve 25 is utilized. Then the initiation of a trace by the cathode beam across the screen of the tube coincides with the initiation of a frequency sweep by oscillator 24. If sinusoidal frequency variation is utilized, corresponding to curve 26, then terminal 32 is supplied with sinusoidal voltage properly related in frequency and phase to the rate of frequency variation.

Since sweep generators and vertical deflection amplifiers are commonly contained in commercial oscilloscopes and are well known in the art, they have not been illustrated in the drawing.

In the present embodiment of my invention, I have shown a connection from detector 27 to terminal 30, so that the output voltage from circuit 29 and that from detector 27 are applied simultaneously to the vertical deflection plates of the cathode ray tube. The resulting trace on the fluorescent screen of the tube is then as illustrated by curve 33. This shows the frequency response characteristic of the circuit under test as a curve on which sharp pips or vertical deflections of the trace are superimposed to coincide with the frequency $f_c$ and the 1.5 megacycle intervals centering thereabout.

I have also shown by the dotted line 34 an alternative connection from the detector 27, through a rectifier and filter circuit 35, to a brightening terminal 36 of the oscilloscope. With this connection, the desired frequency markers occur as a change in the intensity of the trace, either as a luminous spot or as a blanked space on curve 33, rather than as the pips which have been illustrated. In such case, circuit 35 is provided with a suitable rectifying and shaping network to recover either the positive or the negative envelope of curve 28. It will be evident that the direct application of a signal, such as is represented by curve 28, to a brightening electrode would be ineffective, since curve 28 contains alternating components which are equal in intensity with respect to a common axis. However, the application of either the positive or the negative envelope thereof will provide either a brightening or a blanking of the cathode ray trace, as the case may be.

Thus my invention provides a number of properly related marker signals correlating the instantaneous frequency of a sweep frequency oscillator with that of the marker oscillator output voltages. This system insures a high order of accuracy in the determination of a frequency response curve. Moreover the secondary markers at frequency intervals of 1.5 or 4.5 megacycles are not generated directly, but are generated by superimposing a modulating frequency on a center frequency. This eliminates the necessity of separately generating each marker frequency, and insures the same accurate spacing between all of the useful markers at any setting of the center frequency.

My system is also readily adapted to providing a center frequency marker which can be conveniently adjusted to different values, and secondary marker points which are accurately maintained at predetermined intervals from the center frequency. In such an application, an adjustable calibrated oscillator is used to provide the center frequency, and crystal oscillators may be used to provide the modulating frequencies.

While a specific embodiment has been shown and described, it will, of course, be understood that various modifications may be made without departing from the invention. Thus the frequencies which have been given, and the application to television which has been described, are purely by way of illustration. The appended claims, are, therefore, intended to cover any such modifications within the true spirit and scope of the invention.

What I claim as new and desire to secure by Letters Patent of the United States is:

1. In combination a source of fixed frequency carrier waves, a source of a plurality of harmonically related fixed frequency waves, means for mixing said waves to derive upper and lower side bands of said harmonically related waves centered about said carrier waves together with said carrier waves, a source of adjustable frequency waves, means for sweeping the frequency of said adjustable frequency waves over a given frequency range including the frequencies of said mixed waves, a detector circuit, means for applying said mixed waves and said swept frequency waves to said detector circuit for producing beat signals whenever the frequency of the swept frequency waves coincides substantially with the frequency of said mixed waves, a test circuit, a cathode ray tube having two pairs of deflection terminals for deflecting the beam thereof along respective coordinates thereof, means for applying said sweep frequency waves through said test circuit to said one pair of said deflection terminals, means for applying to the other pair of deflection terminals a voltage varying in accordance with the frequency variations of said source of adjustable frequency waves, whereby an indication is produced on said cathode ray tube in which the deflection along said one coordinate with respect to deflection along said other coordinate is a measure of the frequency response of said network, and means to apply said beat signals to said cathode ray tube to cause changes in said indication during the occurrence of said signals to provide accurate frequency markers on said indication corresponding to the frequencies of said carrier waves and said upper and lower side bands.

2. A system for accurately determining the frequency response characteristic of a network having a pair of input and a pair of output terminals, comprising a sweep frequency generator for providing voltages of frequencies cyclically variable over a band of frequencies, means for applying the output from said generator to said input terminals, an oscillator having a center frequency lying within said band, a modulating frequency generator for producing voltages of predetermined frequencies, means for mixing the outputs of said oscillator and said modulating generator for providing signals at said center frequency and at frequencies separated therefrom by said predetermined frequencies, means for beating the frequencies from said mixing means with the frequencies from said sweep frequency generator to produce beat signals whenever the frequency from said sweep frequency generator approaches the frequencies of the signals from said mixing means, a cathode ray tube having two pairs of deflection terminals for deflecting the beam thereof along the respective coordinates thereof, means for applying the signals from the output terminals of said network to one pair of said deflection terminals, means for applying to the other pair of said deflection terminals a voltage varying in accordance with the variation in frequency of said sweep frequency generator, whereby an indication is produced on said cathode ray tube in which the deflection along said one coordinate with respect to the deflection along said other coordinate is a measure of the frequency response of said network, and means to apply said beat signals to said cathode ray tube to cause changes in said indication during the occurrence of said signals to provide accurate markers on said indication corresponding to said center frequency and frequencies spaced from said center frequency by said predetermined frequencies.

3. A marker generator used in conjunction with a sweep frequency generator and a cathode ray tube to measure the response with respect to frequency of a network over a band of frequencies, said sweep frequency generator producing voltages of substantially constant amplitude cyclically variable in frequency over said band of frequencies, said cathode ray tube having two pairs of deflection terminals for deflecting the cathode ray beam thereof along respective coordinates thereof, the output of said sweep frequency generator being applied to said network, the output from said network being applied to one pair of said deflection terminals and a voltage varying in accordance with the frequency variations of said sweep frequency generator being applied to the other of said pair of deflection terminals to produce on the screen of said cathode ray tube an indication of the response of said network with frequency, comprising an oscillator having a center frequency lying within said band of frequencies, a modulating frequency generator for producing voltages of predetermined frequencies, means for mixing the outputs of said oscillator and said modulating generator for producing signals at said center frequency and frequencies separated therefrom by said predetermined frequencies, means for beating said frequencies from said mixing means with the frequencies from said sweep frequency generator to produce beat signals whenever the output from said sweep frequency generator substantially coincides with the frequencies of the signals from said mixing means, means for applying said beat signals to said one pair of cathode ray deflection terminals to cause changes in said indication during the occurrence of said signals to provide accurate frequency markers on said indication corresponding to said center frequency and frequencies spaced therefrom by said predetermined frequencies.

4. A marker generator used in conjunction with a sweep frequency generator and a cathode ray tube to measure the response with respect to frequency of a network over a band of frequencies, said sweep frequency generator producing voltages of substantially constant amplitude cyclically variable in frequency over said band of frequencies, said cathode ray tube having two pairs of deflection terminals for deflecting the cathode ray beam thereof along respective coordinates thereof, the output of said sweep frequency generator being applied to said network, the output from said network being applied to one pair of said deflection terminals and a voltage varying in accordance with the frequency variations of said sweep frequency generator being applied to the other of said pair of deflection terminals to produce on the screen of said cathode ray tube an indication of the response of said network with frequency, comprising an oscillator having a center frequency lying within said band of frequencies, a modulating frequency generator for producing voltages of predetermined frequencies, means for mixing the outputs of said oscillator and said modulating generator for producing signals at said center frequency and frequencies separated therefrom by said predetermined frequencies, means for beating said frequencies from said mixing means with the frequencies from said sweep frequency generator to produce beat signals whenever the output from said sweep frequency generator substantially coincides with the frequencies of the signals from said mixing means, means for detecting said signals and applying said detected signals to said cathode ray tube to vary the intensity of said electron beam to cause changes in said indication during the occurrence of said signals to provide accurate frequency markers on said indication corresponding to said center frequency and frequencies spaced from said center frequency by said predetermined frequencies.

5. In a system for measuring the variation of amplitude with frequency of voltage from a circuit under test to which is applied a voltage substantially constant in amplitude and variable in frequency over a range of frequencies, the combination of a sweep frequency generator for developing a voltage cyclically variable in frequency over said range, an oscillator for providing a voltage having a frequency lying within said range, a source of modulating voltage for providing voltages having predetermined frequencies, means for combining said modulating voltages with the voltage from said oscillator to produce a group of voltages including a voltage having the frequency of said oscillator and voltages having frequencies separated from said oscillator frequency on each side thereof by said predetermined frequencies, means for beating the voltage from said combining means with the voltage of said sweep generator, means for deriving beat voltages whenever two of said frequencies substantially coincide, means for applying the output from said sweep frequency oscillator to said corcuit, means for detecting the voltages from said circuit, an oscilloscope indicator having two pairs of deflection terminals for deflecting the indicating element thereof along respective coordinates thereof, means for applying to one of said pairs of deflection terminals said detected voltages and said beat voltages, means for applying to the other of said pairs of deflection terminals a voltage which varies in accordance with the variation in frequency of said sweep frequency oscillator, whereby an indication is produced on said oscilloscope in which the deflection along said one coordinate with respect to a deflection along said other coordinate is a measure of amplitude response with respect to frequency of said circuit and in which frequency markers are caused to be produced on said indication at points thereof corresponding to the frequencies from said combining means.

GEORGE F. DEVINE.

REFERENCES CITED

The following references are of record in the file of this patent:

UNITED STATES PATENTS

| Number | Name | Date |
|---|---|---|
| 2,084,760 | Beverage | June 22, 1937 |
| 2,121,359 | Luck et al. | June 21, 1938 |
| 2,243,234 | Von Duhn | May 27, 1941 |

FOREIGN PATENTS

| Number | Country | Date |
|---|---|---|
| 912,880 | France | May 13, 1946 |

(Corresponding U. S. No. 2,534,957, Dec. 19, 1950.)